United States Patent
Jung et al.

(10) Patent No.: US 8,955,757 B2
(45) Date of Patent: Feb. 17, 2015

(54) APPARATUS FOR COLLECTING WIRELESS ENERGY AND WIRELESS ELECTRONIC LABEL EMPLOYING THE APPARATUS

(75) Inventors: Sung-chan Jung, Changwon (KR); Min-geun Song, Suwon (KR); Hyung-chul Kim, Suwon (KR); Youngoo Yang, Suwon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 503 days.

(21) Appl. No.: 13/335,208

(22) Filed: Dec. 22, 2011

(65) Prior Publication Data
US 2012/0163049 A1 Jun. 28, 2012

(30) Foreign Application Priority Data
Dec. 22, 2010 (KR) .......................... 10-2010-0132816

(51) Int. Cl.
*G08B 5/22* (2006.01)
*H02J 17/00* (2006.01)

(52) U.S. Cl.
CPC ...................................... *H02J 17/00* (2013.01)
USPC ............................ 235/492; 343/860; 340/7.33

(58) Field of Classification Search
USPC ................ 235/492; 340/10.34, 7.33; 343/860
See application file for complete search history.

(56) References Cited

U.S. PATENT DOCUMENTS

2004/0155754 A1* 8/2004 Fischer et al. ............. 340/10.34
2004/0257293 A1* 12/2004 Friedrich et al. ............. 343/860

FOREIGN PATENT DOCUMENTS

| JP | 2006-166415 A | 6/2006 |
| KR | 10-0659272 B1 | 12/2006 |
| KR | 10-0747659 B1 | 8/2007 |

* cited by examiner

*Primary Examiner* — Daniel Hess

(57) ABSTRACT

An apparatus for collecting wireless is provided. The apparatus includes an antenna and a collection circuit. The antenna generates an alternating current (AC) voltage from a radio wave. The collection circuit generates a direct current (DC) voltage corresponding to the AC voltage, determines whether the DC voltage is lower than a preset value, and changes an internal impedance of the collection circuit if it is determined that the DC voltage is lower than the preset voltage.

22 Claims, 3 Drawing Sheets

APPARATUS FOR COLLECTING WIRELESS ENERGY AND WIRELESS ELECTRONIC LABEL EMPLOYING THE APPARATUS

CROSS-REFERENCE TO RELATED PATENT APPLICATION

This application claims priority from Korean Patent Application No. 10-2010-0132816 filed on Dec. 22, 2010 in the Korean Intellectual Property Office, the disclosure of which is incorporated herein in its entirety by reference.

BACKGROUND

1. Field

Apparatuses consistent with exemplary embodiments relate to generating a direct current (DC) voltage by collecting a radio wave.

2. Description of the Related Art

As wireless communication and mobile communication systems have developed, wireless electronic devices which operate at low electric-power are increasing. Such wireless electronic products are so small that they are used as portable devices or are used by being attached to mobile units.

Apparatuses for collecting wireless energy which generate a DC voltage by collecting wireless energy are employed by such wireless electronic devices and supply operating electric-power to the wireless electronic devices.

According to a method of collecting wireless energy, wireless electronic devices may be classified into wireless electronic devices for collecting energy of a specific frequency of a transmitter and wireless electronic devices for collecting energy of an electromagnetic skywave frequency.

A wireless electronic device for collecting energy of a specific frequency of a transmitter has a problem in that the amount of received electric-power is not sufficient when the wireless electronic device is located far away from the transmitter.

A wireless electronic device for collecting energy of an electromagnetic skywave frequency may receive electric-power irrespective of the position of the wireless electronic device, but has a problem in that, since a level of electromagnetic wave energy is limited by laws dealing with radio waves, the amount of received electric-power is not sufficient.

SUMMARY

One or more exemplary embodiments provide an apparatus which generates relatively large DC electric-power by efficiently collecting wireless energy, and an electronic device employing the apparatus.

According to an aspect of an exemplary embodiment, there is provided an apparatus for collecting wireless energy, the apparatus including: an antenna which generates an alternating current (AC) voltage from a radio wave; and a collection circuit which generates a DC voltage corresponding to the AC voltage, determines whether the DC voltage is lower than a preset value, and changes an internal impedance of the collection circuit if it is determined that the DC voltage is lower than the preset voltage.

The collection circuit may include: a rectifier which outputs the DC voltage by rectifying the AC voltage; an impedance transformer which is connected to the antenna and the rectifier, and changes the internal impedance according to a control signal; a detector which detects the DC voltage output from the rectifier; and a controller which determines whether the detected DC voltage is lower than the preset voltage, and changes the impedance of the impedance transformer by sending the control signal to the impedance transformer if it is determined that the detected DC voltage is lower than the preset voltage.

The collection circuit may further include a charger which outputs a charging voltage generated using a DC voltage output from the rectifier after the internal impedance is changed.

The rectifier may be a differential rectifier of which an efficiency is higher than an efficiency of a double rectifier in a range of AC electric-power below a predetermined level, where the efficiency refers to a ratio of the DC voltage output from the rectifier to the AC voltage rectified by the rectifier.

According to an aspect of another exemplary embodiment, there is provided an electronic device, such as a radio frequency identifier (RFID), including: an antenna which generates an alternating current (AC) voltage from a radio wave; a collection circuit which generates a DC voltage corresponding to the AC voltage, determines whether the DC voltage is lower than a preset value, and changes an internal impedance of the collection circuit if it is determined that the DC voltage is lower than the preset voltage; and a main circuit which operates using a DC voltage output from the collection circuit after the internal impedance is changed.

The collection circuit may include: a rectifier which outputs the DC voltage by rectifying the AC voltage; an impedance transformer which is connected to the antenna and the rectifier, and changes the internal impedance according to a control signal; a detector which detects the DC voltage output from the rectifier; and a controller which: determines whether the detected DC voltage is lower than the preset voltage; and changes the impedance of the impedance transformer by sending the control signal to the impedance transformer if it is determined that the detected DC voltage is lower than the preset voltage.

When a total impedance of the internal impedance of the collection circuit and an impedance at an output side of the collection circuit is matched to an impedance of the antenna, a maximum amount of electric-power energy moves from the antenna to the collection circuit. The impedance at the output side of the collection circuit refers to an impedance of the main circuit of the electronic device.

However, since a frequency of the radio wave detected by the antenna changes continually, the impedance at the antenna side and the impedance of the collection circuit vary continually.

Accordingly, when the DC voltage of the collection circuit is reduced to a value lower than the preset voltage due to impedance mismatching, the internal impedance of the collection circuit is changed. That is, the internal impedance of the collection unit is changed until the DC voltage is increased to a value equal to or higher than the preset voltage.

Accordingly, as compared to a related art apparatus for collecting wireless energy which has simple collecting and rectifying functions, since impedance matching is performed to ensure an optimal electric-power conversion efficiency in a band where a large amount of radio wave signals exist, wireless energy may be efficiently collected, and thus, a relatively high DC electric-power may be generated in the apparatus.

Furthermore, even when an electronic device, such as a wireless device, for collecting energy of a specific frequency of a transmitter is located far away from the transmitter, possibility that the electronic device additionally collects energy of a skywave electromagnetic wave frequency may be increased.

Likewise, although an electronic device, such as a wireless electronic device, for collecting energy of a skywave electromagnetic wave frequency, collects low electromagnetic wave energy, possibility that the electronic device additionally collects energy of a specific band radiated from a transmitter present around the electronic device may be increased.

BRIEF DESCRIPTION OF THE DRAWINGS

The above and other aspect will become more apparent by describing in detail exemplary embodiments with reference to the attached drawings, in which.

DETAILED DESCRIPTION OF THE EXEMPLARY EMBODIMENTS

The following description and the attached drawings are provided for better understanding of the inventive concept, and descriptions of techniques or structures related to the inventive concept which would be obvious to one of ordinary skill in the art will be omitted.

Also, the exemplary embodiments and the drawings provided in the present application should not be construed as limiting the scope of the inventive concept defined by the claims. The terms used in the specification should not be limited to their conventional or lexical meaning and should be construed as having meanings and concepts corresponding to the inventive concept in order to most appropriately describe the inventive concept.

Exemplary embodiments will now be described more fully with reference to the accompanying drawings.

Figure 1:
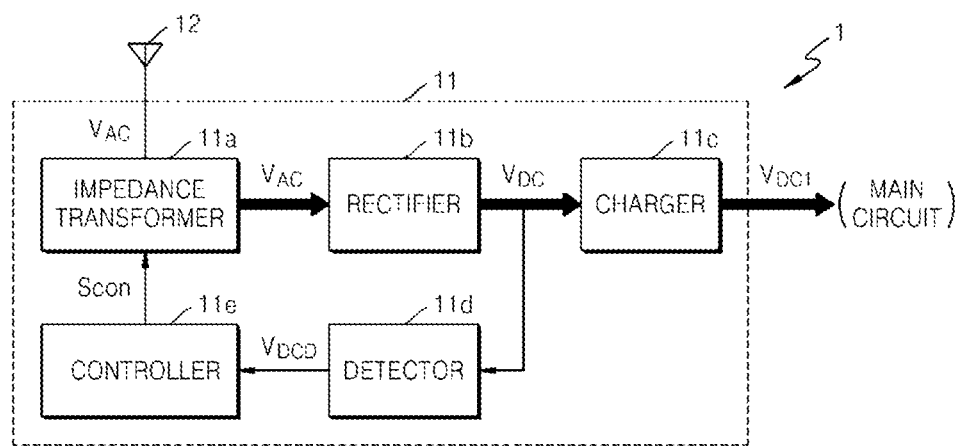
FIG. 1 is a block diagram illustrating an apparatus for collecting wireless energy, according to an exemplary embodiment.

FIG. 1 is a block diagram illustrating an apparatus 1 for collecting wireless energy, according to an exemplary embodiment.

Referring to FIG. 1, the apparatus 1 which generates a DC voltage $V_{DC1}$ by collecting radio waves includes an antenna 12 and a collection circuit 11. The DC voltage $V_{DC1}$ is generated by the apparatus 1 is output to a main circuit of an electronic device, such as a wireless electronic device, connected to the apparatus 1.

The antenna 12 generates a wired AC voltage $V_{AC}$ by detecting a radio wave. The collection circuit 11 generates the DC voltage $V_{DC1}$ by rectifying the AC voltage $V_{AC}$ output from the antenna 12, and changes an internal impedance thereof when the DC voltage $V_{DC1}$ is lower than a preset voltage.

When a total impedance of the main circuit and the collection circuit 11 is complex-conjugate matched to an impedance of the antenna 12, a maximum amount of electric-power energy moves from the antenna 12 to the collection circuit 11. An impedance at an output side of the collection circuit 11 refers to an impedance of the main circuit of the electronic device, for example, a wireless electronic label such as an RFID label, employing the apparatus 1 of FIG. 1.

However, since a frequency of the radio wave detected by the antenna 12 changes continually, an impedance of the antenna 12 and an impedance of the collection circuit 11 also changes continually.

Accordingly, when a DC voltage $V_{DC}$ of the collection circuit 11 is lower than the preset voltage due to impedance mismatching between the antenna 12, the collection circuit 11 and the electronic device, the internal impedance of the collection circuit 11 is changed. That is, until the DC voltage $V_{DC}$ is equal to or higher than the preset voltage, the internal impedance of the collection circuit 11 is changed.

Accordingly, as compared to a related art apparatus for collecting wireless energy which has simple collecting and rectifying functions, since impedance matching is performed to ensure optimal electric-power conversion efficiency in a band where a large amount of radio wave signals exist, wireless energy may be efficiently collected and a relatively high DC electric-power may be generated in the apparatus 1 of FIG. 1.

Furthermore, even when an electronic device, such as a wireless device, for collecting energy of a specific frequency of a transmitter is located far away from the transmitter, possibility that the electronic device additionally collects energy of a skywave electromagnetic wave frequency may be increased.

Likewise, although an electronic device, such as a wireless electronic device, for collecting energy of a skywave electromagnetic wave frequency, collects low electromagnetic wave energy, possibility that the electronic device additionally collects energy of a specific band radiated from a transmitter present around the electronic device may be increased.

The collection circuit 11 includes a rectifier 11b, an impedance transformer 11a, a detector 11d, and a controller 11e.

The rectifier 11b generates the DC voltage $V_{DC}$ by rectifying the AC voltage $V_{AC}$ output from the antenna 12.

The impedance transformer 11a is disposed between the antenna 12 and the rectifier 11b, is connected to the antennal 12 and the rectifier 11b, and changes its impedance according to an input control signal Scon.

The detector 11d outputs a detected DC voltage $V_{DCD}$ by detecting the DC voltage $V_{DC}$ output from the rectifier 11b.

The controller 11e changes the impedance of the impedance transformer 11a by using the control signal Scon when the detected DC voltage $V_{DCD}$ output from the detector 11d is lower than the preset voltage.

In FIG. 1, the collection circuit 11 further includes a charger 11c that outputs a charging voltage $V_{DC1}$ using the DC voltage $V_{DC}$ output from the rectifier 11b.

When the controller 11e changes the impedance of the impedance transformer 11a by using the control signal Scon, the controller 11e gradually or sequentially changes the impedance of the impedance transformer 11a in a range where the impedance of the impedance transformer 11a is variable.

Figure 2:
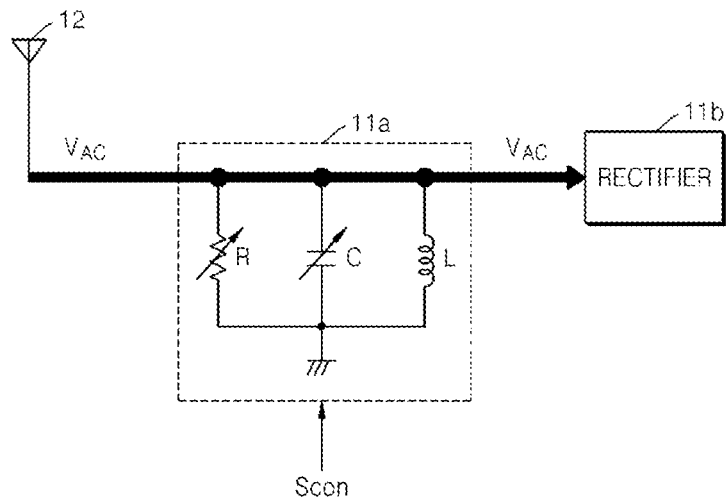
FIG. 2 is a circuit diagram illustrating an impedance transformer of the apparatus of FIG. 1, according to an exemplary embodiment.

FIG. 2 is a circuit diagram illustrating the impedance transformer 11a of the apparatus 1 of FIG. 1, according to an exemplary embodiment.

Referring to FIG. 2, a variable resistor R, a variable capacitor C, and an inductor L of the impedance transformer 11a are connected in parallel to an impedance at an output side of the collection circuit 11. The impedance at the output side of the collection circuit 11 refers to the impedance of the main circuit of the electronic device, for example, a wireless electronic label, employing the apparatus 1 of FIG. 1.

The controller 11e changes the impedance of the impedance transformer 11a by adjusting a resistance value and a capacitance value of the variable resistor R and the variable capacitor C, respectively, by using the control signal Scon. The controller 11e gradually or sequentially changes the impedance of the impedance transformer 11a in a range where the impedance of the impedance transformer 11a is variable.

The variable resistor R, the variable capacitor C, and the inductor L may be formed as a lumped element and a distributed element, or as a switch, a diode, and a transistor, as is well known in the art.

Figure 3:
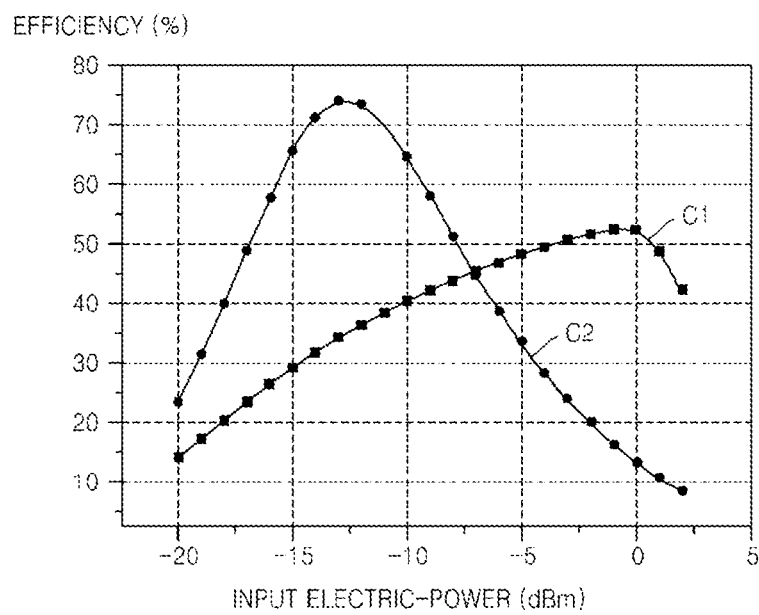
FIG. 3 is a graph illustrating a relationship between efficiency and input electric-power when the rectifier 11b of the apparatus 1 of FIG. 1 is a doubler rectifier and when the rectifier 11b of the apparatus 1 of FIG. 1 is a differential rectifier, according to an exemplary embodiment.

FIG. 3 is a graph illustrating a relationship between efficiency and input electric-power when the rectifier 11b of the apparatus 1 of FIG. 1 is a doubler rectifier and when the rectifier 11b of the apparatus 1 of FIG. 1 is a differential rectifier, according to an exemplary embodiment. The doubler rectifier is a rectifier for rectifying an AC voltage output from an antenna. The differential rectifier is a rectifier for rectifying an AC voltage by switching operations of field effect transistors (FETs) and is used in an experiment related to an exemplary embodiment explained below.

In FIG. 3, efficiency (%) refers to a ratio of output DC electric-power to input AC electric-power in the rectifier 11b of the apparatus 1 of FIG. 1. In FIG. 3, a first characteristic curve C1 indicates a case when the doubler rectifier is used as the rectifier 11b, and a second characteristic curve C2 indicates a case when the differential rectifier is used as the rectifier 11b.

Referring to FIG. 3, it is found that an efficiency of the doubler rectifier is higher when the input AC electric-power is higher than about −7 dBm whereas an efficiency of the differential rectifier is higher when the input AC electric-power is lower than about −7 dBm.

Accordingly, since an electronic device has a problem in terms of operation when input AC electric-power is low, it is preferable, but not necessarily, that an electronic device, such as a wireless electronic label which receives wireless electric-power, uses a differential rectifier, according to an exemplary embodiment.

However, as is well known, the efficiency of a differential rectifier is greatly affected by a frequency of an input AC voltage. Accordingly, impedance matching is necessary in order to have a maximum electric-power conversion efficiency according to frequency bands. Table 1 shows efficiencies of a differential rectifier obtained after optimal impedance matching is performed according to frequency bands of an input AC voltage.

TABLE 1

| Frequency | Impedance | Efficiency |
|---|---|---|
| 450 MHz | 150-j933.05 Ω | 64.81% |
| 900 MHz | 70-j452.39 Ω | 73.79% |
| 1800 MHz | 19-j237.50 Ω | 71.36% |
| 2300 MHz | 13.5-j192.20 Ω | 70.52% |

Referring to Table 1, if the rectifier 11b of the apparatus 1 of FIG. 1 is a differential rectifier, although an electronic device employing the apparatus 1 of FIG. 1 is designed to operate at a high-efficiency frequency of 1800 MHz, since impedance mismatching occurs whenever a received frequency is changed, an efficiency of the rectifier 11b may be maintained due to impedance matching.

However, when the detected DC voltage $V_{DCD}$ output from the detector 11d (see FIG. 1) is lower than a preset voltage due to the impedance mismatching, the controller 11e (see FIG. 1) changes the impedance of the impedance transformer 11a by using the control signal Scon. That is, the impedance of the impedance transformer 11a is gradually or sequentially changed in a range where the impedance of the impedance transformer 11a is variable.

Accordingly, as compared to a related apparatus for collecting wireless energy which has simple collecting and rectifying functions, since impedance matching is performed to ensure an optimal electric-power conversion efficiency in a band where a large amount of radio wave signals exist, wireless energy may be efficiently collected and a relatively high DC electric-power may be generated in the apparatus 1 of FIG. 1.

Furthermore, even when an electronic device, such as a wireless device, for collecting energy of a specific frequency of a transmitter is located far away from the transmitter, possibility that the electronic device additionally collects energy of a skywave electromagnetic wave frequency may be increased.

Likewise, although an electronic device, such as a wireless electronic device, for collecting energy of a skywave electromagnetic wave frequency, collects low electromagnetic wave energy, possibility that the electronic device additionally collects energy of a specific band radiated from a transmitter present around the electronic device may be increased.

Figure 4:
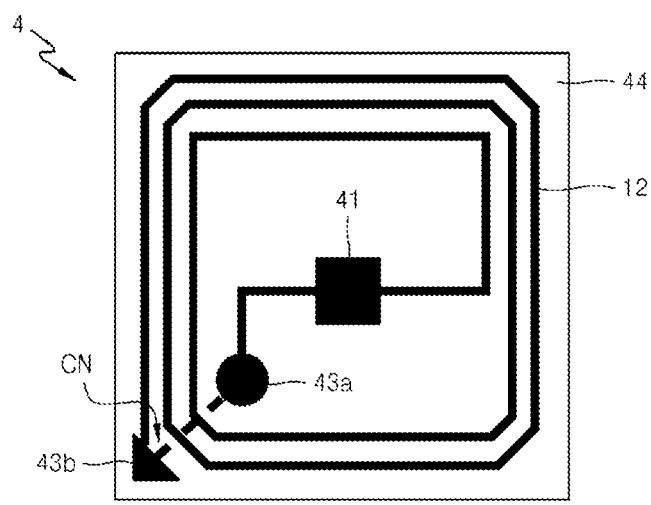
FIG. 4 is a plan view illustrating an RFID tag which is a wireless electronic label, according to an exemplary embodiment.

FIG. 4 is a plan view illustrating an RFID tag 4 which is a wireless electronic label, according to an exemplary embodiment. The RFID tag 4 corresponds to the electronic device discussed in relation with the apparatus 1 in reference to FIGS. 1 and 2.

Referring to FIG. 4, the RFID tag 4 includes a substrate 44, and an IC device 41 and the antenna 12 disposed on the substrate 44. The antenna 12 forms a single closed loop through the IC device 41. That is, a conductor is connected to a connection area CN between connection terminals 43a and 43b.

Figure 5:
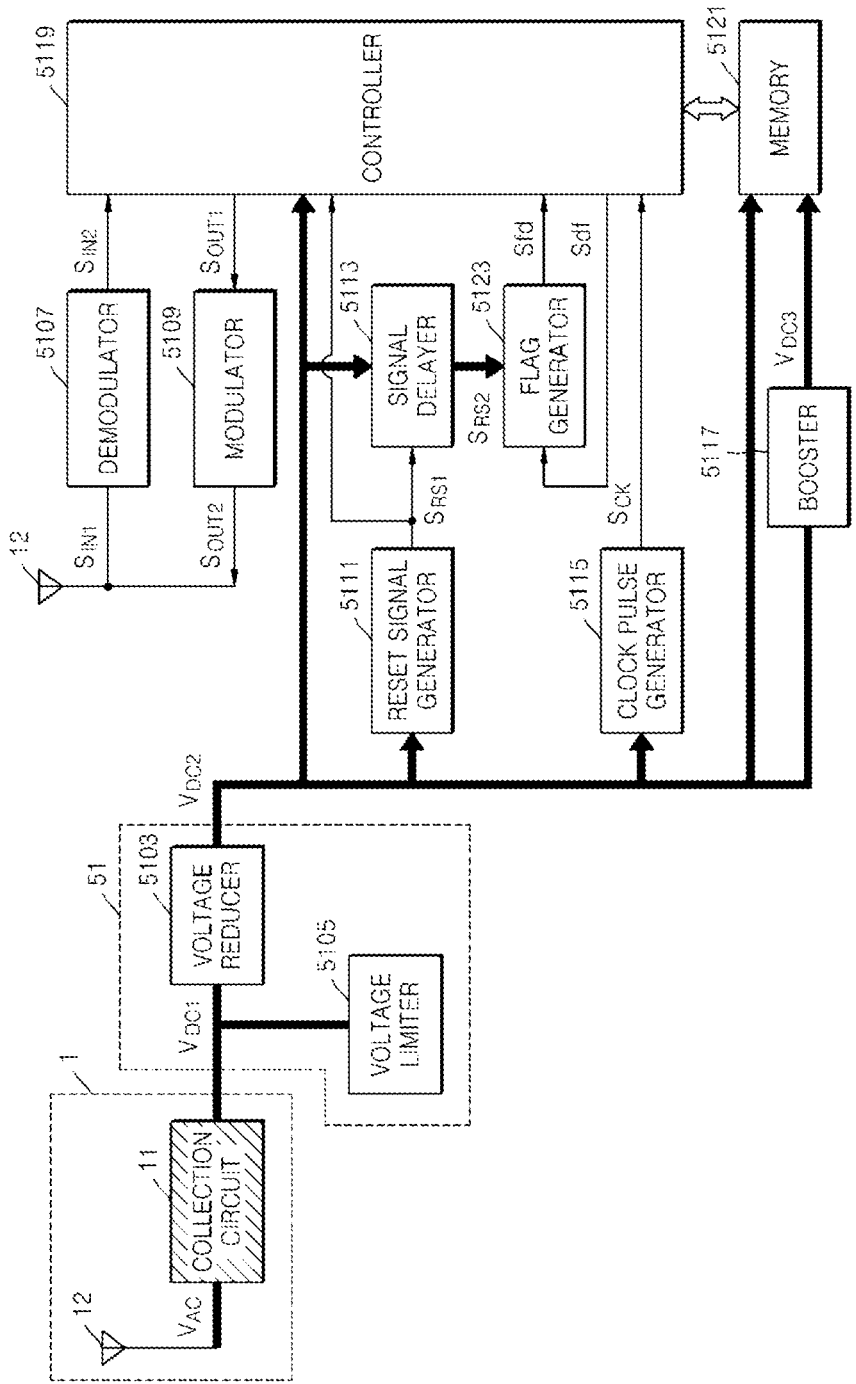
FIG. 5 is a block diagram illustrating an integrated circuit (IC) device of the RFID tag of FIG. 4, according to an exemplary embodiment.

FIG. 5 is a block diagram illustrating the IC device 41 of the RFID tag 4 of FIG. 4, according to an exemplary embodiment.

Referring to FIG. 5, the RFID tag 4 of FIG. 4 includes the apparatus 1 for collecting wireless energy and a main circuit. The main circuit operates using DC electric-power output from the apparatus 1.

A structure, an operation, and effect of the apparatus 1 have been described with reference to FIGS. 1 through 3. Accordingly, only the main circuit will be explained.

The main circuit includes a controller 5119, a voltage adjusting unit 51, a clock pulse generator 5115, a reset signal generator 5111, a signal delayer 5113, a demodulator 5107, a modulator 5109, a memory 5121, a booster 5117, and a flag generator 5123.

The voltage adjusting unit 51 converts the DC voltage $V_{DC1}$ output from the collection circuit 11 into a set DC voltage $V_{DC2}$, and provides the set DC voltage $V_{DC2}$ to the controller 5119. The clock pulse generator 5115 provides clock pulses $S_{CK}$ to the controller 5119 while the set DC voltage $V_{DC2}$ output from the voltage adjusting unit 51 is increased to a value equal to or higher than a predetermined level which is lower than a rated level. The reset signal generator 5111 generates a reset signal $S_{RS1}$ having a high logic state while the set DC voltage $V_{DC2}$ output from the voltage adjusting unit 51 is increased to a value equal to or higher than the rated level, and provides the reset signal $S_{RS1}$ to the controller 5119.

The set DC voltage $V_{DC2}$ output from the voltage adjusting unit 51 is also provided to the signal delayer 5113.

The signal delayer 5113 delays the reset signal $S_{RS1}$ output from the reset signal generator 5111 for about 20 µs, and provides a delayed reset signal $S_{RS2}$ as electric-power to the flag generator 5123. That is, the flag generator 5123 starts operating later than the controller 1119.

Accordingly, right before the RFID tag 4 (see FIG. 4) reproduces and transfers a flag signal from a reader, when electric-power is turned off and then is turned on for a short time due to instant electric-power supply instability, the flag generator 5123 starts operating later than the controller 5119.

Accordingly, even when a flag signal having an unknown logic state is input to the flag generator 5123 right after the controller 5119 starts operating, the flag generator 5123 does not respond to the flag signal. Also, the flag generator 5123 outputs to the controller 5119 a flag signal having a logic state which is reproduced and stored right before electric-power is turned off. That is, a flag signal having a logic state which is reproduced and stored right before electric-power is turned off may be transferred to the reader through the controller 5119. Accordingly, the reader receives the flag signal having the logic state which the reader has transmitted, thereby resuming communications.

As a result, a problem that communications between a wireless electronic label and a reader are inefficiently delayed due to instant electric-power supply instability may be solved.

Meanwhile, the demodulator 5107 demodulates an input signal $S_{IN1}$ output from the antenna 12, and provides a demodulated input signal $S_{IN2}$ to the controller 5119. Also, the modulator 5109 modulates an output signal $S_{OUT1}$ output from the controller 5119, and provides a modulated output signal $S_{OUT2}$ to the antenna 12.

Identification information is stored in the memory 5121, for example, an electrically erasable programmable read-only memory (EEPROM) which is a nonvolatile memory.

The set DC voltage $V_{DC2}$ of about 1.7 V output from the voltage adjusting unit 51 is provided to the memory 5121. However, in order to write data output from the demodulator 5107 to the memory 5121, a higher voltage, for example, a voltage of 3.3 V, is necessary. Accordingly, the booster 5117, for example, a charge pump, increases the set DC voltage $V_{DC2}$ output from the voltage adjusting unit 51, and provides a write operating voltage $V_{DC3}$ to the memory 5121.

Meanwhile, the voltage adjusting unit 51 includes a voltage limiter 5105 and a voltage reducer 5103.

The voltage limiter 5105 limits a level of the DC voltage $V_{DC1}$ output from the apparatus 1 so as not to exceed an upper limit level of, for example, about 3.6 V.

The voltage reducer 5103 reduces the DC voltage $V_{DC1}$ output from the apparatus 1, and provides the set DC voltage $V_{DC2}$ of about 1.7 V to the controller 5119.

As described above, according to embodiments, the collection circuit 11 generates a DC voltage by rectifying an AC voltage output from the antenna 12, and changes an internal impedance thereof when the DC voltage is lower than a preset voltage.

When a total impedance of the internal impedance of the collection circuit 11 and an impedance at an output side of the collection circuit 11 is matched to an impedance of the antenna 12, a maximum amount of electric-power energy moves from the antenna 12 to the collection circuit 11. The impedance at the output side of the collection circuit 12 refers to an impedance of a main circuit of a wireless electronic product, for example, a wireless electronic label, employing the apparatus 1.

However, since a frequency of a radio wave detected by the antenna 12 changes continually, the impedance of the antenna varies continually.

Accordingly, when the DC voltage of the collection circuit 11 is reduced to a value lower than a preset voltage due to impedance mismatching, the internal impedance of the collection circuit 11 is changed. That is, the internal impedance of the collection circuit 11 is changed until the DC voltage is increased to a value equal to or higher than the preset voltage.

Accordingly, as compared to a conventional apparatus for collecting wireless energy which has simple collecting and rectifying functions, since impedance matching is performed to ensure an optimal electric-power conversion efficiency in a band where a large amount of radio wave signal exists, wireless energy may be efficiently collected and thus a relatively large amount of DC electric-power may be generated in the apparatus 1 of FIG. 1.

Furthermore, even when a wireless electronic device for collecting energy of a specific frequency of a transmitter is farther away from the transmitter, a possibility that energy of a electromagnetic wave frequency may be additionally collected is increased.

Likewise, although a wireless electronic device for collecting energy of a electromagnetic wave frequency has low electromagnetic wave energy, a possibility that energy of a specific band radiated from a transmitter adjacent to the wireless electronic device may be additionally collected is increased.

While the inventive concept has been particularly shown and described with reference to the above exemplary embodiments thereof using specific terms, the embodiments and terms should not be construed as limiting the scope of the inventive concept defined by the claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. An apparatus for collecting wireless energy, the apparatus comprising:
   an antenna configured to generate an alternating current (AC) voltage from a radio wave; and
   a collection circuit configured to generate a direct current (DC) voltage corresponding to the AC voltage, determine whether the DC voltage is lower than a preset value due to impedance mismatching, and change an internal impedance, including an internal resistance via a control signal if it is determined that the DC voltage is lower than the preset voltage, until the DC voltage is increased to a value equal to or higher than the preset voltage,
   wherein the collection circuit comprises:
      a rectifier configured to output the DC voltage by rectifying the AC voltage,
      an impedance transformer connected to the antenna and the rectifier, and configured to change the internal impedance, including an internal resistance of the collection circuit according to the control signal;
      a detector configured to detect the DC voltage output from the rectifier; and
      a controller configured to determine whether the detected DC voltage is lower than the preset voltage, to produce the control signal; and
      change the impedance of the impedance transformer by sending the control signal to the impedance transformer, if it is determined that the detected DC voltage is lower than the preset voltage.

2. The apparatus of claim 1, wherein the rectifier is a differential rectifier of which an efficiency is higher than an efficiency of a double rectifier in a range of AC electric-power below a predetermined level, where the efficiency refers to a ratio of the DC voltage output from the rectifier to the AC voltage rectified by the rectifier.

3. The apparatus of claim 1, wherein the collection circuit further comprises a charger which outputs a charging voltage generated using a DC voltage output from the rectifier after the internal impedance is changed.

4. The apparatus of claim 1, wherein the collection circuit is configured to: generate the DC voltage corresponding to the AC voltage generated from the antenna;
determine whether the DC voltage is lower than the preset voltage; and
change the internal impedance, if it is determined that the DC voltage is lower than the preset voltage, to change so that a DC voltage output from the collection circuit to an electronic device changes.

5. The apparatus of claim 4, wherein the electronic device is a radio frequency identifier (RFID) tag, and
wherein the antenna is configured to detect the radio wave generated by an RFID reader, and generates the AC voltage from the detected radio wave.

6. The apparatus of claim 4, wherein the collection circuit comprises:
a rectifier configured to output the DC voltage by rectifying the AC voltage; an impedance transformer which is connected to the antenna and the rectifier, and configured to change the internal impedance according to a control signal;
a detector configured to detect the DC voltage output from the rectifier; and a controller configured to:
determine whether the detected DC voltage is lower than the preset voltage; and
change the impedance of the impedance transformer by sending the control signal to the impedance transformer if it is determined that the detected DC voltage is lower than the preset voltage.

7. The apparatus of claim 6, wherein the rectifier is a differential rectifier of which an efficiency is higher than an efficiency of a double rectifier in a range of AC electric-power below a predetermined level, where the efficiency refers to a ratio of the DC voltage output from the rectifier to the AC voltage rectified by the rectifier.

8. The apparatus of claim 1, wherein the collection circuit is configured to determine whether the DC voltage is lower than the preset voltage due to impedance mismatching between the antenna, the collection circuit and an electronic device connected to the collection circuit.

9. The apparatus of claim 8, wherein the electronic device is a radio frequency identifier (RFID) tag, and
wherein the antenna is configured to detect the radio wave generated by an RFID reader, and generates the AC voltage from the detected radio wave.

10. The apparatus of claim 1 wherein a total impedance of the internal impedance and an impedance at an output side is matched to an impedance of the antenna in order for a maximum amount of electrical power to be transmitted from the antenna to the collection circuit.

11. The apparatus of claim 1 wherein the impedance transformer is configured to include a variable resistor, a variable capacitor, and an inductor connected in parallel with respect to each other, and connected in parallel with the external device.

12. The apparatus of claim 1 wherein the controller changes the impedance of the impedance transformer by using the control signal to gradually or sequentially change the impedance of the impedance transformer.

13. An electronic device comprising:
an antenna configured to generate an alternating current (AC) voltage from a radio wave;
a collection circuit configured to generate a DC voltage corresponding to the AC voltage, determine whether the DC voltage is lower than a preset voltage, and change an internal impedance if it is determined that the DC voltage is lower than the preset voltage, until the DC voltage is increased to a value equal to or higher than the present voltage;
a main circuit which operates using a DC voltage output from the collection circuit after the internal impedance is changed;
wherein the collection circuit comprises:
a rectifier configured to output the DC voltage by rectifying the AC voltage generated from the antenna;
an impedance transformer connected to the antenna and the rectifier, and configured to change the internal impedance according to a control signal;
a detector configured to detect the DC voltage output from the rectifier; and a controller configured to:
determine whether the detected DC voltage is lower than the preset voltage; and
change the impedance of the impedance transformer by sending the control signal to the impedance transformer if it is determined that the detected DC voltage output from the detector is lower than the preset voltage.

14. The electronic device of claim 11, wherein the rectifier is a differential rectifier of which an efficiency is higher than an efficiency of a double rectifier in a range of AC electric-power which is lower than a predetermined level, where the efficiency refers to a ratio of the DC voltage output from the rectifier to the AC voltage rectified by the rectifier.

15. The electronic device of claim 11, wherein the collection circuit further comprises a charger which outputs to the main circuit a charging voltage generated from a DC voltage output from the rectifier after the internal impedance is changed.

16. The electronic device of claim 13, wherein the collection circuit is configured to: generate the DC voltage corresponding to the AC voltage generated from the antenna;
determine whether the DC voltage is lower than the preset voltage; and
change the internal impedance, if it is determined that the DC voltage is lower than the preset voltage, to change so that a DC voltage output from the collection circuit to the main circuit changes.

17. The electronic device of claim 16, wherein the electronic device is a radio frequency identifier (RFID) tag, and
wherein the antenna is configured to detect the radio wave generated by an RFID reader, and generates the AC voltage from the detected radio wave.

18. The electronic device of claim 16, wherein the collection circuit comprises:
a rectifier configured to output the DC voltage by rectifying the AC voltage; an impedance transformer connected to the antenna and the rectifier, and configured to change the internal impedance according to a control signal;
a detector configured to detect the DC voltage output from the rectifier; and a controller configured to:
determine whether the detected DC voltage is lower than the preset voltage; and change the impedance of the impedance transformer by sending the control signal to the impedance transformer if it is determined that the detected DC voltage is lower than the preset voltage.

19. The electronic device of claim 18, wherein the rectifier is a differential rectifier of which an efficiency is higher than an efficiency of a double rectifier in a range of AC electric-power which is lower than a predetermined level, where the efficiency refers to a ratio of the DC voltage output from the rectifier to the AC voltage rectified by the rectifier.

20. The electronic device of claim 13, wherein the collection circuit is configured to determine whether the DC voltage is lower than the preset voltage due to impedance mismatching between the antenna, the collection circuit and the main circuit.

21. The apparatus of claim 20, wherein the electronic device is a radio frequency identifier (RFID) tag, and
wherein the antenna is configured to detect the radio wave generated by an RFID reader, and generates the AC voltage from the detected radio wave.

22. The electronic device of claim 13, wherein the main circuit comprises:
a controller;
a voltage adjusting unit configured to convert the DC voltage output from the collection circuit into a set DC voltage and provides the set DC voltage to the controller;
a reset signal generator configured to generate a reset signal while the set DC voltage output from the voltage adjusting unit increase to a value equal to or higher than a rated level, and provides the reset signal to the controller;
a flag generator configured to reproduce a flag signal from the controller and transfers the flag signal to the controller; and
a signal delayer configured to delay the reset signal output from the reset signal generator and outputs the delayed reset signal as an electric-power voltage of the flag generator.

* * * * *